United States Patent [19]

Corr, II et al.

[11] Patent Number: 5,348,395
[45] Date of Patent: Sep. 20, 1994

[54] ASPIRATING PYROMETER WITH PLATINUM THERMOCOUPLE AND RADIATION SHIELDS

[75] Inventors: Robert A. Corr, II, Scotia; Joseph Citeno, Schenectady, both of N.Y.

[73] Assignee: General Electric Company, Schenectady, N.Y.

[21] Appl. No.: 987,964

[22] Filed: Dec. 11, 1992

[51] Int. Cl.$^5$ ............... G01K 13/02; G01K 1/08
[52] U.S. Cl. ................. 374/135; 374/138; 374/203; 374/179
[58] Field of Search ............... 136/230, 231, 236.1; 374/135, 138, 139, 147, 148, 208, 179

[56] References Cited

U.S. PATENT DOCUMENTS

| | | | |
|---|---|---|---|
| 2,496,806 | 2/1950 | Moffatt | 374/138 |
| 4,038,105 | 7/1977 | Brandeberry et al. | 374/135 |
| 4,187,434 | 2/1980 | Pater, Jr. et al. | 250/515 |
| 4,485,263 | 11/1984 | Itoyama et al. | 374/208 |
| 4,854,729 | 8/1989 | Lovato | 374/141 |
| 4,984,904 | 1/1991 | Nakano et al. | 374/140 |
| 4,987,749 | 1/1991 | Baier | 374/148 |
| 5,078,507 | 1/1992 | Koller | 374/208 |
| 5,116,137 | 5/1992 | Xiong et al. | 374/132 |

OTHER PUBLICATIONS

"Measurement of Jet Engine Combustion Temperature by the Use of Thermocouples and Gas Analysis," R. C. Williamson et al, Society of Automotive Engineers, Inc., National Air Transportation Meeting, New York, N.Y. Apr. 21–24, 1969.

"Gas Thermocouple Radiation Corrections," General Electric Technical Information Series, L. Berkley et al, No. 75-GTD-40, Jun. 2, 1975.

*Primary Examiner*—William A. Cuchlinski, Jr.
*Assistant Examiner*—G. Bradley Bennett
*Attorney, Agent, or Firm*—Nixon & Vanderhye

[57] ABSTRACT

An aspirating or suction pyrometer for measuring hot combustion gases. A thermocouple in the pyrometer has a temperature sensitive junction formed of platinum alloys. The thermocouple junction is insulated and is encased within a platinum alloy sheath. The sheathed thermocouple is mounted within inner and outer tubular radiation shields. These shields are formed of a platinum alloy having a radiation emissivity substantially the same as the thermocouple. The shields block radiated heat from the flame and combustion chamber from being transferred to the thermocouple. The radiation shields do not themselves radiate heat to the thermocouple because the shields and thermocouple are at the same temperature and formed of substantially the same noble alloys.

6 Claims, 3 Drawing Sheets

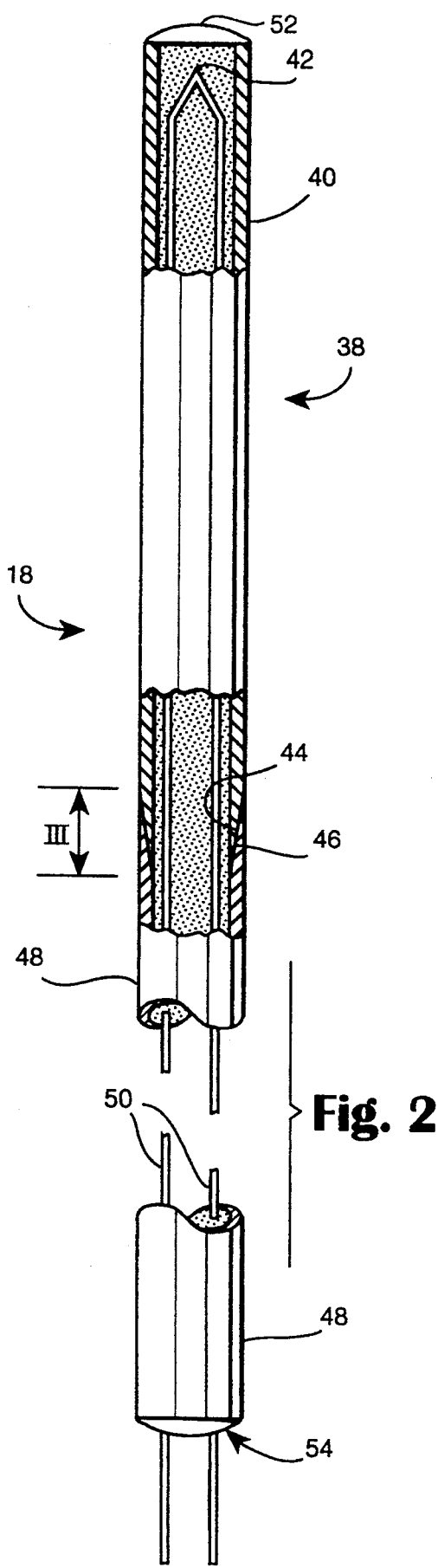
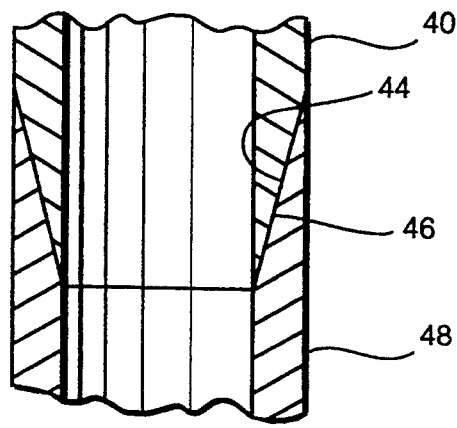

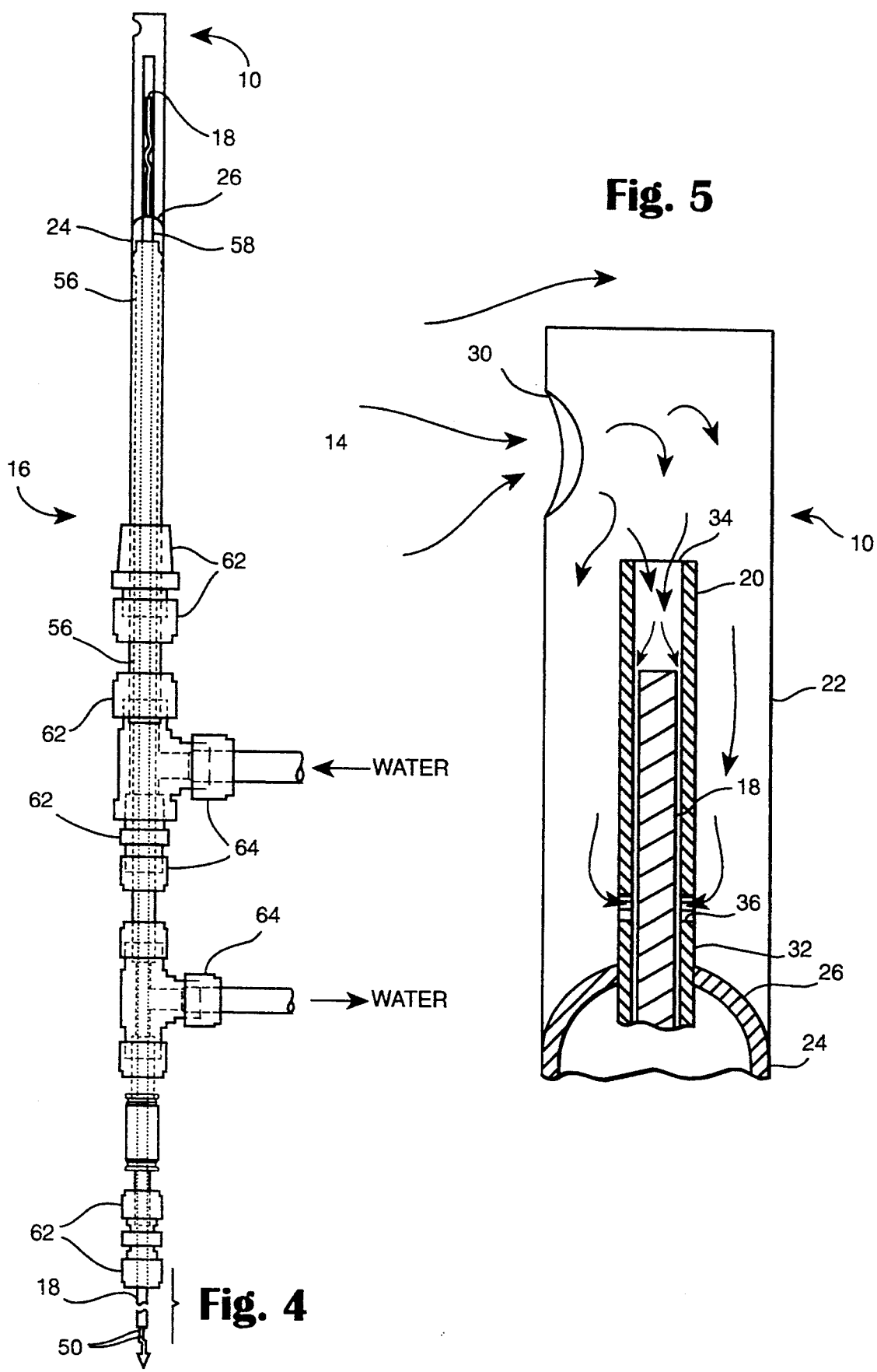

ASPIRATING PYROMETER WITH PLATINUM THERMOCOUPLE AND RADIATION SHIELDS

TECHNICAL FIELD

The invention relates to temperature measurement devices in general. In particular, the invention relates to aspirating and suction pyrometers having radiation shields.

DESCRIPTION OF THE RELATED ART

Aspirating pyrometers, also known as suction pyrometers, are used to measure extraordinarily high temperature gas streams, such as up to 2800° F. For example, high temperature pyrometers are used to measure temperatures in combustors of gas turbines. Combustor temperatures must be measured or estimated to properly evaluate performance of the combustor and gas turbine. However, no commercially available pyrometer has been able to withstand the hot gas temperatures in advanced, high-firing-temperature, combustion-test stands.

Because prior pyrometers cannot withstand such hot gas temperatures, gas analysis has been used to estimate the temperature in combustors. However, direct temperature measurement, such as with a pyrometer, is preferable to gas analysis because direct temperature measurement provides the actual gas stream temperature instead of an estimated temperature. In addition, gas analysis is complex, expensive and slow relative to thermocouple measurement. Accordingly, a long-felt need has existed for pyrometers that directly measure temperatures of gas streams in combustion test stands.

A thermocouple is the temperature measuring apparatus in a pyrometer. A thermocouple measures the temperature of the thermocouple junction. Thus, to measure the temperature of a gas stream, the thermocouple junction must attain the same temperature as the gas stream. On a superficial level it may seem that positioning the thermocouple in the gas stream should cause the junction to attain the temperature of the gas. However, the thermocouple temperature is not a function solely of the gas temperature surrounding the thermocouple. The temperature of a thermocouple in a gas stream is a function of the steady state condition where the rate of heat transfer to the thermocouple junction balances the rate of heat transfer from the junction. The temperature of a gas stream around the junction is only one factor affecting this steady state temperature condition.

The steady state temperature condition of a thermocouple junction in a gas stream results principally by the balancing of four known thermocouple phenomena: (1) heat transfer from the gas stream to the thermocouple by convection, (2) heat transfer between the thermocouple and its surrounding by radiation, (3) heat transfer between the thermocouple junction and its wires by conduction, and (4) conversion of kinetic energy to thermal energy at the boundary layer surrounding the thermocouple. The effect of these phenomena and others on thermocouple temperature measurement in a gas stream are discussed in Williamson, R. C. and Stanforth, C. M., Measurement of Jet Engine Combustion Temperature by the Use of Thermocouple and Gas Analysis, SAE Paper 690,433 (Society of Automotive Engineers, Inc., 1969).

The accuracy of measuring gas stream temperatures with a thermocouple depends to a large extent on how close the thermocouple junction can be brought to the gas stream temperature. Pyrometers are designed to match the temperature of the thermocouple junction to the gas temperature. For example, an aspirating pyrometer increases the effect of convection heat transfer from the gas stream to the thermocouple junction by increasing the gas stream velocity across the thermocouple. Aspirating pyrometers enhance the convection heat transfer between the gas stream and thermocouple to cause the thermocouple junction to better attain the actual gas stream temperature. Aspirating pyrometers enhance the convection heat transfer to diminish the effect of the other phenomena affecting the thermocouple junction temperature.

Aspirating pyrometers are designed to reduce the phenomena, other than that of convection between the gas and thermocouple, that affect the steady state temperature condition of a thermocouple junction. The phenomena of radiation between a thermocouple junction and its surrounding environment influences the steady state temperature condition of a thermocouple. The effect of radiation on a thermocouple varies in proportion to the fourth power of temperature. Accordingly, radiation effects can predominate the other phenomena affecting the steady state condition of a thermocouple at the extraordinarily hot temperatures in state of the art combustion test stands.

Radiation heat transfer is not indicative of the gas stream temperate and causes the steady state thermocouple condition to veer from the actual gas stream temperature. Hot thermocouple junctions radiate heat to the surrounding environment and the surrounding environment radiates heat into the junction. For example, radiation from the flame and combustion chamber can transfer heat to the thermocouple, if the thermocouple is exposed to the flame and combustion chamber. It is known to cover a thermocouple with one or more radiation shields to reduce radiation heat exchange. Radiation shields sheath the thermocouple junction and reduce radiation heat exchange between the junction and its surroundings.

Radiation shields do not eliminate radiation heat exchange. Shields limit the radiation heat exchange to that due to the radiation exchanged between the thermocouple junction and shields. Radiation shields usually attain substantially the same temperature as does the thermocouple junction to minimize the radiation heat transfer between the shield and thermocouple. This technique has not eliminated or rendered negligible the radiation heat transfer between the shield and thermocouple. A correction factor has been applied to the thermocouple measurement to account for the heat exchange due to radiation between the thermocouple junction and shield.

Previously, radiation shields for aspirating pyrometers have been made of a variety of materials that differ from the materials forming the thermocouple junction. For example, U.S. Pat. No. 4,187,434, discloses an aspirating pyrometer having a radiation shield formed of alumina refractory and a thermocouple junction formed of an undisclosed material, but which is certainly not an alumina refractory. Similarly, the Williamson SAE article referenced above identifies twenty thermocouple junction materials and five categories of potential structural and shielding materials. However, the Williamson article does not indicate whether certain thermocouple junction alloys are best suited for use with radiation shields made of a corresponding material.

SUMMARY OF THE INVENTION

An aspirating pyrometer has been invented having a platinum tipped thermocouple and two platinum radiation shields. Hot combustion gases are drawn from the gas stream through an opening in the outer shield and flow over the inner shield. This flow heats the inner radiation shield to the gas stream temperature. A portion of the gas flow over the inner shield is also drawn into the tip of the tubular inner shield and directs the gas at a relatively high velocity over the thermocouple. Accordingly, the radiation shields and thermocouple operate at substantially the same temperature to reduce radiation heat exchange.

The radiation heat transfer between the thermocouple junction and thermocouple has been dramatically and unexpectedly reduced. The reduction of radiation is believed to be the result of using substantially the same noble alloys for the thermocouple junction and the radiation shield.

The radiation emissivity of a material depends on the material as well as its temperature. Two different materials at the same temperature may radiate heat one to the other due to the different emissivity of the materials. Structures formed of the same material and at the same temperature will have negligible radiation exchange. By matching the thermocouple material to the radiation shield material, the radiation heat exchange between the two is negligible. This invention has satisfied the long-felt need for aspirating pyrometers having negligible radiation heat transfer.

In one embodiment, the invention is an aspirating pyrometer comprising a thermocouple having a temperature sensitive junction formed of a noble metal alloy; and a radiation shield formed of substantially the same noble metal alloy as the alloy forming the thermocouple junction, said thermocouple positioned in the shield, where said shield has an opening through which gases are drawn.

It is an object of this invention to accurately measure high temperature gas flows and, in particular, temperatures in a gas turbine combustor. It is a further objective of this invention to enhance the performance of aspirating pyrometers by reducing heat exchange due to radiation. A more specific objection of this invention is to minimize the radiation heat exchange between a thermocouple and radiation shields in an aspirating pyrometer. These objectives have been satisfied by this invention to a degree not previously attained. These objectives and more are apparent from the following detailed description of this invention.

DESCRIPTION OF DRAWINGS

FIG. 2 is cut-away diagram of the thermocouple probe of the aspirating pyrometer shown in FIG. 1;

FIG. 3 is a cross-sectional diagram of a portion of the thermocouple sheath as indicated by section III in FIG. 2;

FIG. 4 is a schematic diagram of the stand-off probe and pyrometer shown in FIG. 1, and FIG. 5 shows the gas flow pattern of the gases drawn into the pyrometer shown in FIG. 1.

DETAILED DESCRIPTION OF THE DRAWINGS

Figure 1:
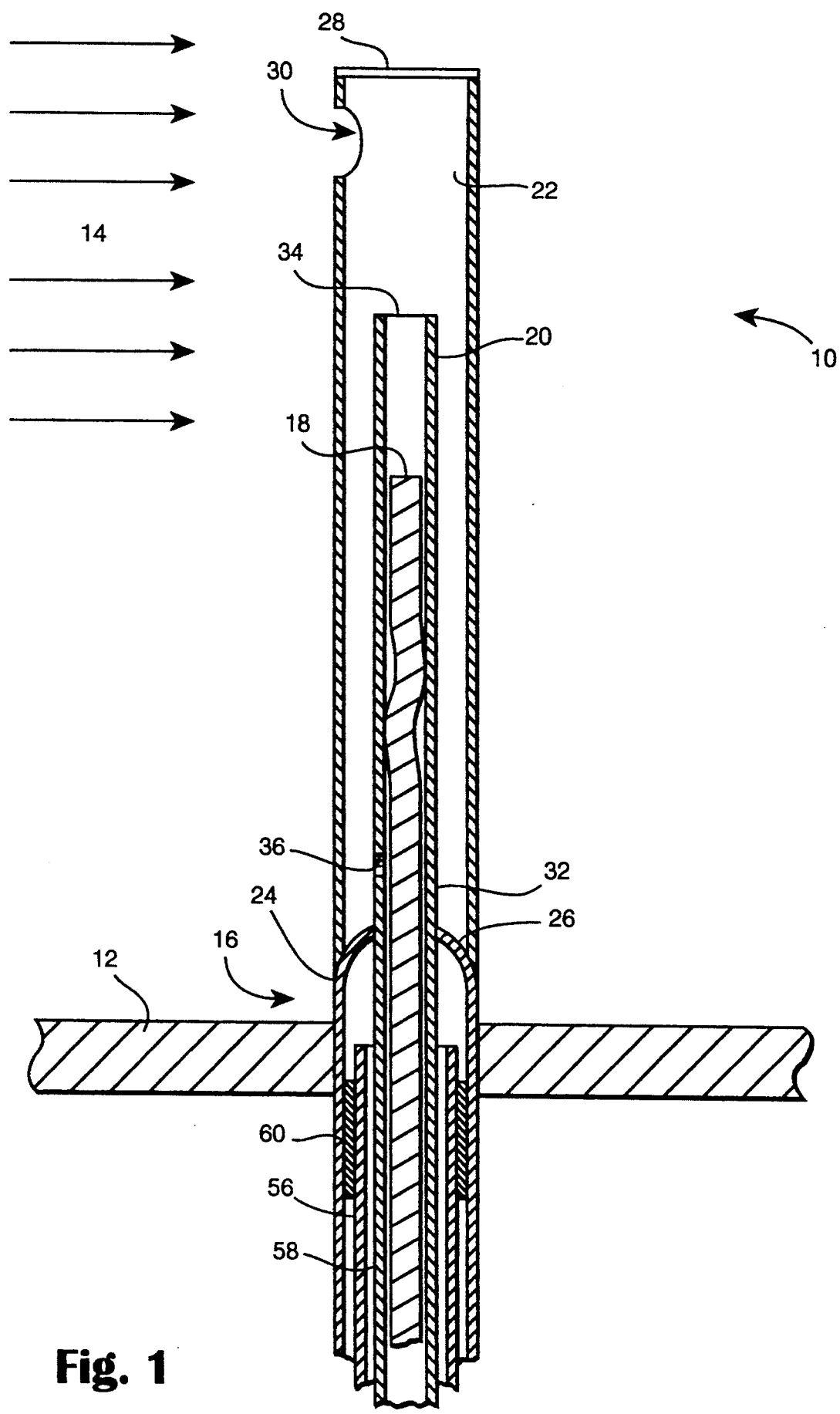
FIG. 1 shows in cross-section an embodiment of an aspirating pyrometer of the current invention.

FIG. 1 shows an aspirating pyrometer 10 extending through the wall 12 of a combustor (not shown) and into a combustion gas stream 14. The pyrometer is mounted onto a conventional water cooled stand-off probe 16, shown in more detailed in FIG. 4. The pyrometer includes a sheathed thermocouple 18 within inner and outer radiation shields, 20 and 22.

The outer radiation shield 22 is a hollow tubular member welded to an outer tube 24 of the stand-off probe. The outer radiation shield is formed of a noble alloy, such as platinum-20% rhodium. The outer radiation shield extends into the gas stream coaxially to the stand-off probe from the hemispherical top 26 of the outer tube of the stand-off probe.

The end of the outer radiation shield opposite to the end welded to the outer tube is sealed with a disk-shaped cap 28. The cap is formed of the same material as is the outer radiation shield. Similarly, the thickness of the cap is substantially the same as the wall thickness of the outer radiation shield, which is 0.032 inches in one embodiment of the pyrometer.

An opening 30 in the cylindrical wall of the outer radiation shield is located near the capped end of the shield. This opening is oriented to face into the gas stream 14 so that a portion of the gas flow enters the hollow interior of the outer shield through the shield opening. The opening is substantially circular and the same diameter as that of the outer radiation shield.

The inner radiation shield 20 is a hollow cylinder mounted within and coaxial to the outer radiation shield 22. The inner radiation shield is formed of the same noble metal alloy as is the outer radiation shield. The outside diameter of the inner radiation shield is approximately 37% of the diameter of the outer radiation shield. In one embodiment, the outer radiation shield has an outside diameter of 0.50 inches and the inner shield has an outside diameter of 0.188 inches. Similarly, the wall thickness of the inner radiation shield is thinner, e.g., 0.020 inches, than the wall thickness of the outer radiation shield.

Mount end 32 of the inner radiation shield is welded onto the top 26 of the outer tube of the stand-off probe. The free end 34 of the inner radiation shield is open to draw combustion gases from the outer radiation shield into the inner radiation shield. Three small circular openings 36 in the wall of the inner radiation shield are located near the mount end 32 of the inner shield. These openings are spaced symmetrically around the circumference of the inner radiation shield. These openings 36 allow combustion gases to be drawn inside of the inner radiation shield from the bottom of the outer radiation shield.

The length of the inner radiation shield 20 is substantially shorter than that of the outer radiation shield. The free end 34 of the inner radiation shield 22 is located substantially down within the outer radiation shield away from the opening 30 in the outer shield. By distancing the inner radiation shield from the opening 30, the likelihood is reduced that the thermocouple 18 within the inner radiation shield will be in a direct line of sight through the opening to the highly radiative combustion flame and hot walls of the combustion test chamber.

The thermocouple 18 is positioned within the hollow interior of the inner radiation shield. The thermocouple is slightly bent so that it will contact for support the inner radiation shield, which has a larger diameter. Thus, the thermocouple is supported radially by the sides of the inner shield.

FIG. 2 shows the sheathed thermocouple 18 in detail. The thermocouple is sheathed in a thin walled tube sheath 38. The tube sheath encases the thermocouple and is a composite of two tubes of different materials mated end-to-end. The end portion 40 that encases the thermocouple junction 42 of the sheath 38 is formed of a noble metal alloy, such as platinum-20% rhodium. This end portion 40 extends outward from the top 26 (FIG. 1) of the outer tube of the stand-off probe. This end portion 40 has a tapered end 44 (FIG. 3) that is coaxially inserted into a conical end 46 of an extended tube sheath 48 formed of inconel. The extended tube sheath 48 is substantially longer in length than the end portion 40, but is same diameter as the end portion 40. The extended tube sheath is housed within the outer tube 24 and is part of the stand-off probe 16.

The thermocouple sheath 38 is packed with magnesium oxide (MgO) insulation that surrounds the thermocouple junction and lead wires 50 inside the hollow sheath. The sheath is sealed with a cap 52 formed of platinum-20% rhodium at the end of the sheath near the thermocouple junction. The opposite end 54 of the sheath is sealed with epoxy and is the end from which the lead wires 50 extend. The thermocouple lead wires extend the length of the tube sheath 38 from the junction 42 and out the epoxy seal. One lead wire is formed of platinum-6% rhodium and the other lead wire is formed of platinum-30% rhodium. The lead wires are welded to form the ungrounded thermocouple junction 42.

As shown in FIG. 4, the thermocouple is welded to the end of a conventional water-cooled stand off probe 16. The stand-off probe includes the outer tube 24 in which is coaxially mounted an open ended inner tube 56, an open ended sample tube 58, and the lower portion of the sheathed thermocouple probe 18. The inner tube 40 is held in position by an annular spacer 60 (FIG. 1) that fits snugly between the outer tube and inner tube. The sample tube fits snugly in an opening in the top 26 of the outer tube 24. In addition, the inner and sample tubes are secured in position by conventional fittings 62 that hold the stand-off probe together. In addition, a water jacket 64 circulates cooling water over the sample tube. Moreover, the end of the sample tube is coupled to a suction device (not shown) for drawing combustion gases through the pyrometer and sample tube.

FIG. 5 shows the flow of combustion gases that are drawn into the aspirating pyrometer 10. Combustion gases 14 impinge on and are drawn into the opening 30 in the outer radiation shield that faces into the gas stream. The hot combustion gases flow down into the outer radiation shield and around the outside of the inner radiation shield 20. The inner radiation shield is heated by this flow of combustion gases and by radiative heat transfer from the outer radiation shield. The inner radiation shield also receives radiated heat from the flame to the extent that the flame is visible to the inner radiation shield through the opening 30.

The flow of combustion gases into and through the outer radiation shield 22 is facilitated by the suction through the inner radiation shield 20 due to the suction device coupled to the sample tube 58 (FIGS. 1 and 4). Combustion gases are drawn into the free end 34 of the inner radiation shield and openings 36 at the mount end 32 of the inner radiation shield. The openings 36 deep inside of the radiation shields ensure that the combustion gases flow down to the lower outer surface of the inner radiation shield to heat the lower section of the inner shield to the gas temperature.

The temperature of the inner radiation shield is approximately the same temperature as the gas stream because of the flow of gases over the inner shield. Similarly, the sheathed thermocouple 18 exchanges heat by convection with the gases that are drawn inside the inner radiation shield such that the thermocouple temperature is substantially the same temperature as the gas stream 14. The heat exchanged between the thermocouple and radiation shields due to radiation which skews the thermocouple temperature from the gas temperature is minimized because the shields and thermocouple are at the same temperature and have the same radiative emissivity because they are formed of substantially the same noble metal alloys. Accordingly, the effect of radiation heat transfer on the measured temperature is negligible.

The invention has been described in connection with its preferred embodiment. However, the preferred embodiment is not to be used to unduly restrict the invention. Rather, the scope of the invention is commensurate with that of the following claims and their equivalents.

What is claimed is:

1. An aspirating pyrometer comprising:
   a thermocouple having a temperature sensitive junction formed of noble metal alloys; and
   a radiation shield formed of a substantially similar noble metal alloy as the alloys forming said junction, said thermocouple being enclosed within said shield, and said shield having an opening through which hot gases are drawn.

2. An aspirating pyrometer as in claim 1 wherein said junction is formed of a weld of a lead of platinum-30% rhodium and another lead of platinum-6% rhodium, and said radiation shield is formed of platinum-20% rhodium.

3. An aspirating pyrometer as in claim 1 wherein said thermocouple further comprises a sheath covering said junction, said sheath in the vicinity of said junction being formed of a noble metal alloy substantially the same as the noble metal alloy forming said radiation shield and said sheath being enclosed within said radiation shield.

4. An aspirating probe as in claim 3 wherein said sheath in the vicinity of said junction and said radiation shield are formed of platinum-20% rhodium, and said junction is formed of a weld of a lead of platinum-30% rhodium and another lead of platinum-6% rhrodium.

5. An aspirating probe as in claim 1 wherein said noble metal is platinum.

6. An aspirating probe as in claim 1 wherein said radiation shield comprises a hollow tubular outer radiation shield having an opening exposed to a gas stream through which gases enter the outer radiation shield, and a hollow tubular inner radiation shield coaxially mounted within said outer radiation shield, said inner radiation shield having an opening at one end through which pass gases from inside the outer radiation shield, and said thermocouple mounted within said inner radiation and being exposed to gases passing through said inner radiation shield.

* * * * *